Oct. 29, 1963 R. G. McLAGAN 3,108,798
PROPORTIONAL MEASURING TIMER
Filed July 10, 1961 4 Sheets-Sheet 4

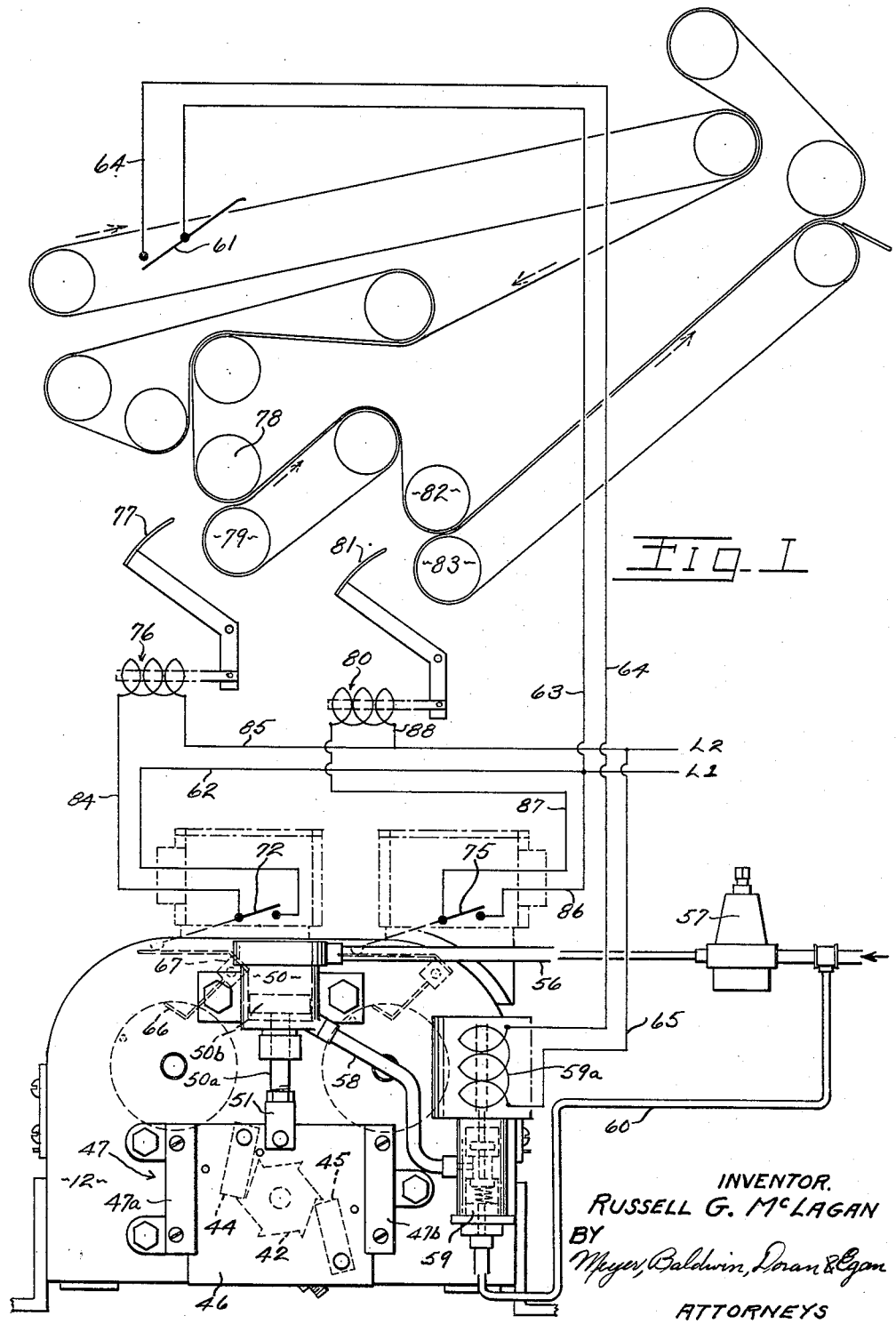

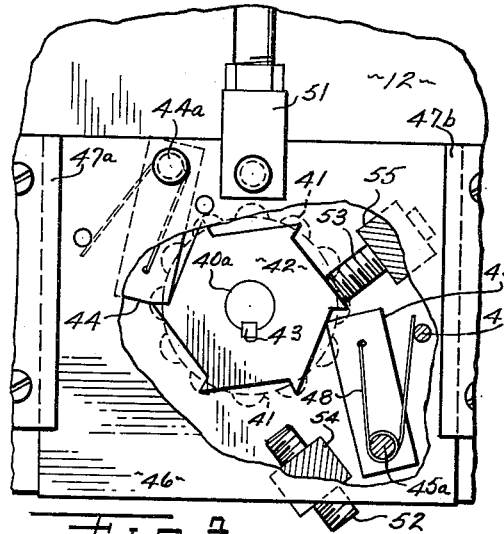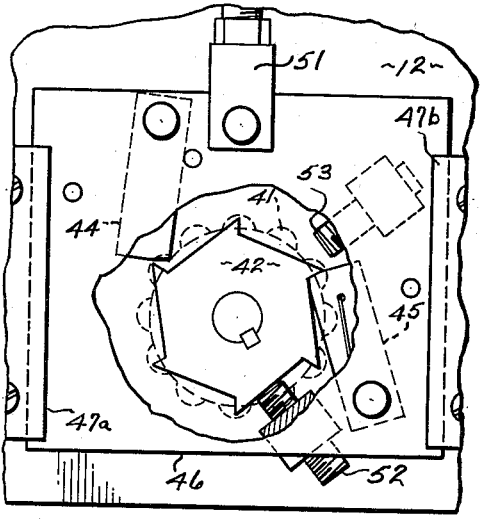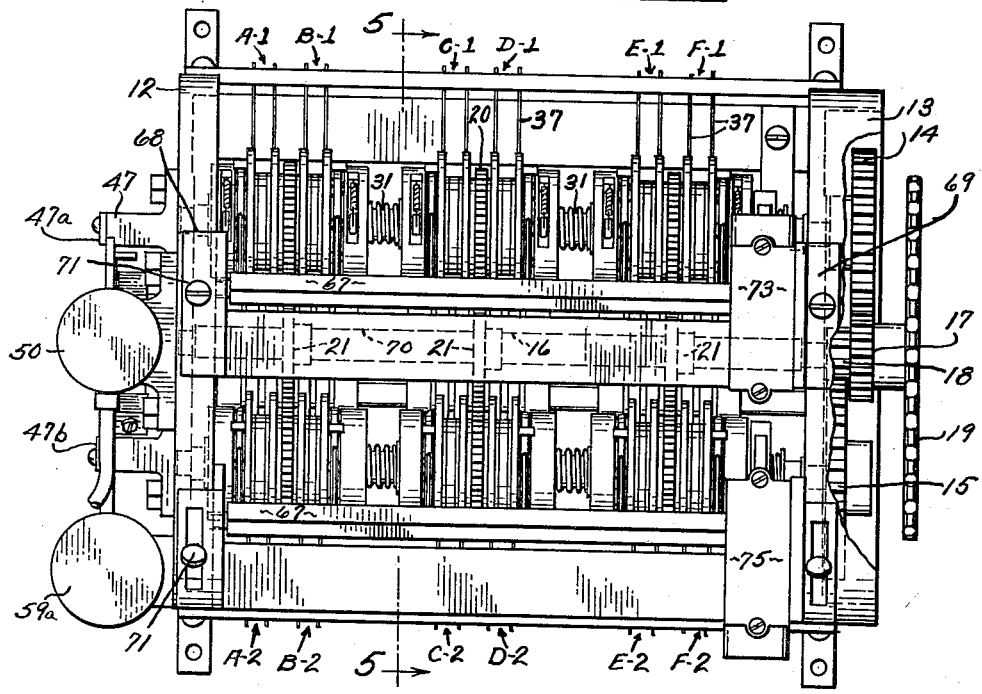

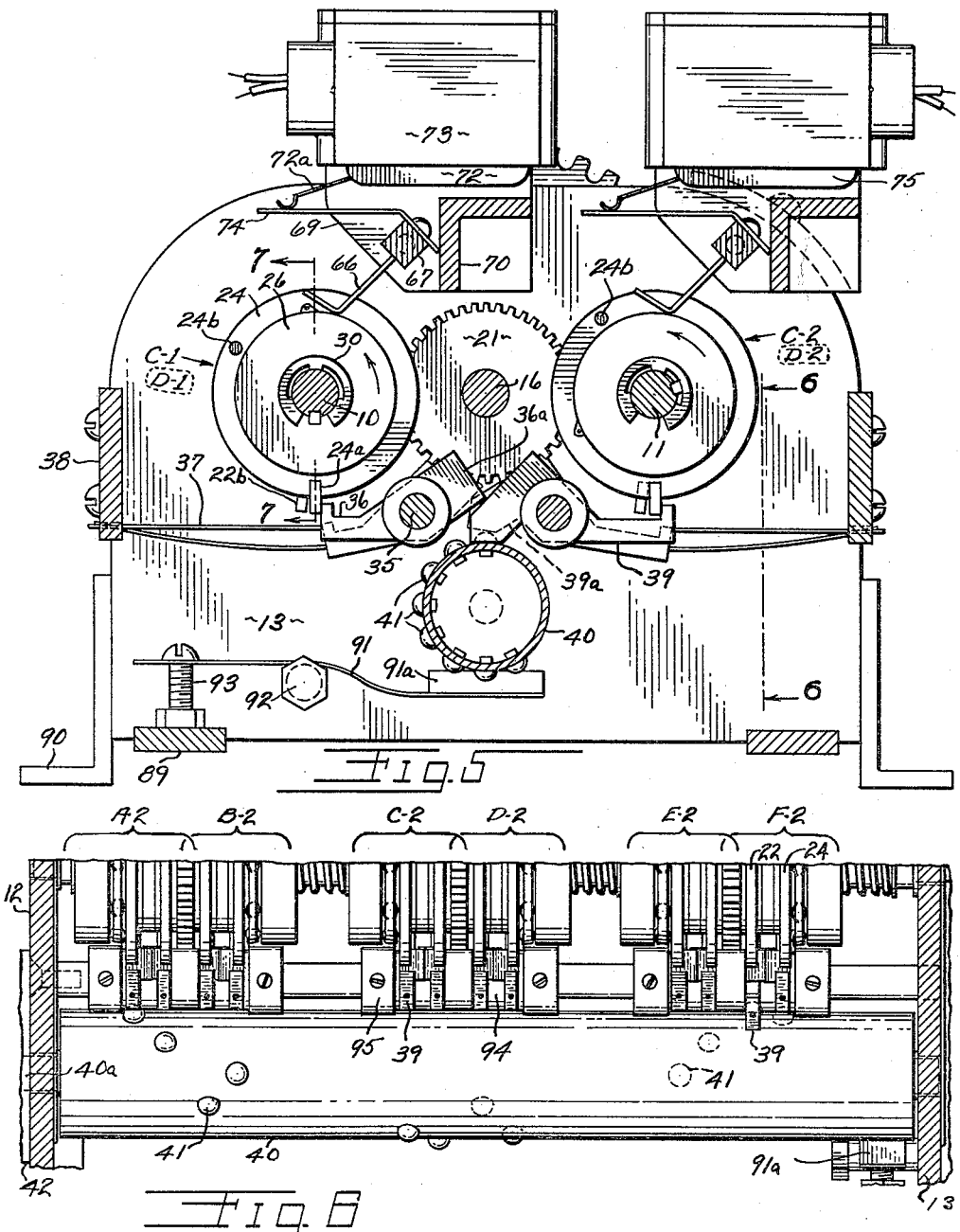

INVENTOR.
RUSSELL G. McLAGAN
BY Meyer, Baldwin, Doran & Egan
ATTORNEYS

United States Patent Office 3,108,798
Patented Oct. 29, 1963

3,108,798
PROPORTIONAL MEASURING TIMER
Russell G. McLagan, Milford, Ohio, assignor to McGraw-Edison Company, Elgin, Ill., a corporation of Delaware
Filed July 10, 1961, Ser. No. 122,775
11 Claims. (Cl. 270—81)

This invention relates to novel and improved sequence control devices for the timed control of operations on a series of articles moving in succession along a path. For illustration the invention will be described in its adaptation to the proportional folding of flatwork articles such as sheets, towels, or the like. The invention is particularly adapted to a sequential actuator for a multiple unit measuring timer of the proportional type wherein articles are folded along fold lines which bear a substantially accurate fractional relationship to the length of the article even when successive articles in the moving series vary in length within certain operating limits.

An object of the present invention is to provide novel and improved control means for combining a plurality of such timing units for sequential operation, each unit being effective to control the operation on a respective article in the series, and the next unit on the next article, etc. In this way several timing operations may proceed with a concurrent overlap if short articles are following each other in rapid succession.

A further object of the invention is to provide a novel and improved sequential timer of the character defined in the last preceding paragraph, and wherein a single prime mover serves as the operating means for all units, and simultaneously effects sequential operation thereof.

A further object of the invention is to provide control means for suitable application of the prime mover to its task including a specialized cam shaft with double-acting ratchet energization.

A further object of the invention is to provide double-acting ratchet means as defined in the last preceding paragraph, and wherein the first increment of ratchet movement initiates a timing cycle for a measuring operation and the second increment of ratchet movement terminates the proportional phase of the timing.

Other objects and advantages will be apparent from a study of the following specification in conjunction with the accompanying drawings which show one exemplification of a folding machine equipped with my proportional control.

In said drawings:

FIG. 1 shows, mainly in diagrammatic form, the interrelationship and some of the operating elements of a two-fold folding machine and a timer conforming to my present invention.

FIG. 2 is a top plan view of the timer.

FIG. 3 is an elevational view of a fragmental portion of the timer as seen from the left end of FIG. 2, sometimes herein termed the front end, the detail being somewhat enlarged and showing the sequence ratchet mechanism.

FIG. 4 is a view similar to FIG. 3, but showing some movable parts in a different operating position.

FIG. 5 is a transverse sectional view taken on the line 5—5 of FIG. 2.

FIG. 6 is side elevational view as seen from the location of the line 6—6 of FIG. 5.

Figure 7:
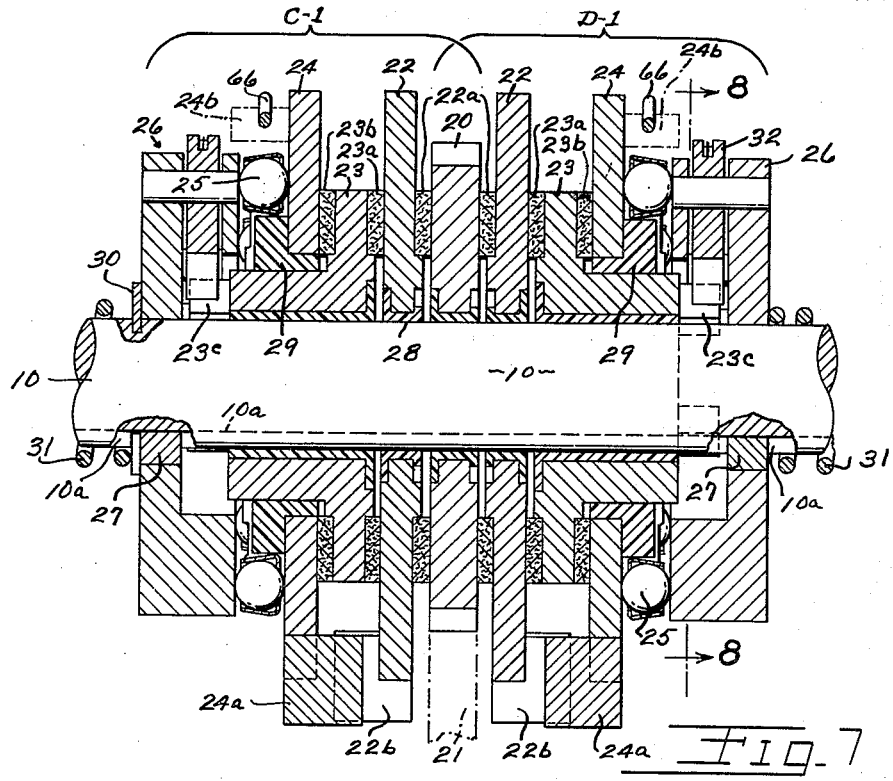
FIG. 7 is a vertical sectional view taken on the line 7—7 of FIG. 5, and somewhat enlarged.

Proceeding now to a description of the invention, and referring first to the upper portion of FIG. 1, I show a conveyor system for feeding a series of articles in succession along a path and past a first and a second folding zone where respective first and second folding arms perform folding operations on the article. The operations are performed in timed sequence, responsive primarily to sensitive means in the path of travel which means is actuated by the article itself as it passes the article-sensitive means. A timer control responsive to operation of the sensitive means sets up successive time delay periods which are determined by the actual article length, as will appear, and at the respective ends of the several periods the travelling article will have arrived at the first and second folding zones in sequence, so that the folds are accomplished at the proper fractional locations on the article. In later parts of this specification the elements of the conveyor system, the article-sensitive means, and the proportional control means will be more particularly identified and described.

The control apparatus shown in the drawings is adapted to control the making of two consecutive folds, for example on a bed sheet, and involves the conventional folding of the sheet first at the midpoint of its length and then at the midpoint of the once-folded sheet. To do this the proportional-speed rotating elements of the first fold units rotate at half synchronous speed and the proportional speed elements of the second fold units rotate at one-fourth of the synchronous speed. By synchronous speed I mean a lineal speed identical with the speed of travel of the conveyor. To compensate for the space between the first and second fold points, the second-fold actuator travels somewhat farther. If the timer were to be used wth the reciprocating blade type of folder, the corresponding speeds would be three-quarter and one-quarter, all of this being conventional, as more fully described, for example, in my prior U.S. Patent No. 2,659,598, granted November 17, 1953, for Proportional Sequence Control for Folders.

Taking the front as being the end with the ratchet device, FIGS. 2, 3 and 4, there are six first-fold units and six second-fold units. They may be regarded as six independent timer sections, each comprising one first-fold unit and one second-fold unit. These six independent timers operate sequentially to control the folding of six successive articles. They are designated on FIGURE 2 as A, B, C, D, E and F, with the suffix 1 or 2 indicating respectively the first or second fold unit of the section. It will be noticed that the mechanisms are in the form of double units, such as A–1, B–1. This economizes in parts and space, A–1 and B–1 being "back-to-back" so as to utilize the same, common, full-speed driving means.

The six first-fold units are mounted on shaft 10 (left to right along the top of FIG. 2) and the six second-fold units are on shaft 11 (bottom of FIG. 2). The shafts 10 and 11 are journalled in end frames 12 and 13, and carry gears 14 and 15 respectively at the rear end (right side of FIG. 2). A central unit-speed shaft 16, also journalled in the end frames, has a pinion 17 engaging gear 14 and a pinion 18 engaging gear 15. Pinion 17 is of greater circumferential extent than pinion 18, and gear 15 is larger than gear 14, and as a result shaft 11 will rotate at a lower speed than shaft 10. A sprocket 19 on shaft 16 will be chain-driven from some suitable part of the associated folding machine. The dimensional relationships of these various gears, pinions etc. are such that the unit-speed shaft 16 rotates continuously in synchronism with the conveyor travel of the folding machine, and first-fold shaft 10 and second-fold shaft 11 rotate at one-half and one-quarter synchronous speed respectively. It may be borne in mind, therefore, that shafts 10, 11 and 16 are in continuous rotation but at respectively different rotational speeds.

Taking the middle double unit C–1, D–1 on the first-fold shaft as representative, it will be seen from FIGURE 7 that a gear 20, which is the synchronous or unit-speed driving means, is common to both the unit C–1 and D–1. As indicated in FIGURE 2, the six such gears are continuously driven by three gears 21 on the central shaft 16.

The elements of units C–1 and D–1 and likewise the other paired units are identical except that they are reversed in mirror-image assembly so to speak (FIGS. 2 and 7). Similar numerals will be used for these elements. At each side of unit speed gear 20 is a unit speed disc 22 with a friction ring 22a secured thereto. Next to disc 22 is a friction clutch 23 with a friction ring 23a, 23b secured to its two faces. Next to these is the timing disc 24. This bears against a ball thrust bearing 25, which in turn bears against the housing of an overrunning clutch 26. The latter rotates with shaft 10, driven by a key 27 secured to the clutch but axially free, left to right, in the shaft keyway 10a. The other elements are not driven by the shaft, the gear 20, unit speed disc 22, and friction clutch being freely mounted on the shaft with suitable bushings 28 of low frictional characteristics, such as nylon. Also, timer disc 24 is freely mounted by means of a sleeve-bushing 29 that fits on a hub of friction clutch member 23. This bushing 29 also supports ball bearing 25. The shaft 10 and overrunning clutches 26 are therefore directly driven at one-half unit speed from gear 14 at the end of the shaft, while the unit speed gear 20 is directly driven at unit speed from gear 21 on main shaft 16.

A split ring retaining member 30 (FIG. 7) fitting into a groove in the shaft provides an abutment at the left end of the element stack, and a compression spring 31 on the shaft at the right end of the stack yieldingly presses the cooperating elements into mutual engagement, and against the end abutment 30, spring 31 abutting against the retainer ring 30 of the neighboring group, etc.

Figure 8:
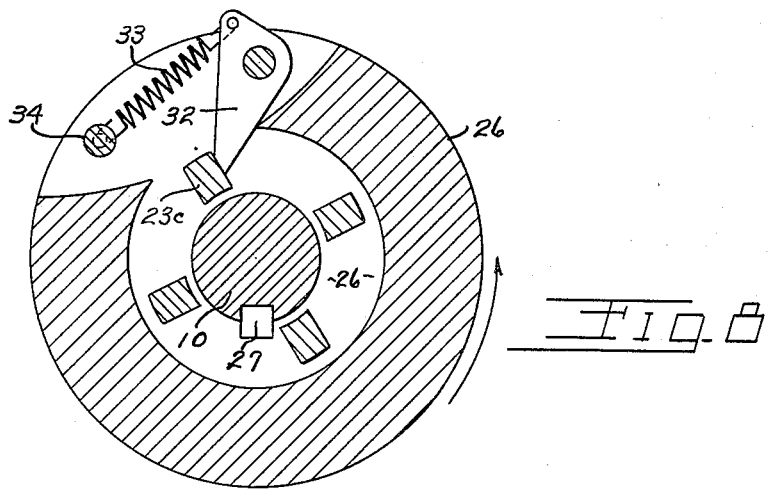
FIG. 8 is a sectional view taken on the line 8—8 of FIG. 7.

Extending from the end of the hub on friction clutch member 23 are four lugs or teeth 23c (FIG. 8) having the function of ratchet teeth. They extend into the hollow central part of clutch 26. Cooperating with these teeth is a pawl 32. This is pivotally mounted in a slotted section of the clutch body and yieldingly held as shown in FIGURE 8 by a spring 33 anchored to a pin 34. Normally, therefore, friction clutch member 23 will be rotated at the first-fold proportional speed, i.e., ½ unit speed, through overrunning clutch 26 from shaft 10. The gear 20 will be rotating at ful or unit speed. The several frictional driving engagements are ineffective to rotate the timer disc 24 during inactive periods, however, by reason of retainer elements operated by the actuating and sequence device, to be described hereinafter.

Shaft 35 carried by the two end frames mounts twelve retainer members 36 (FIG. 5). These are free on the shaft so as to be independently rockable from an "up," retaining position to a "down," releasing position. A length of spring wire 37 secured in the end of the retainer member and fitting through a guide hole in frame side brace 38 yieldingly holds the retainer in its upper position. As seen in FIGURE 5, the end or toe of the retainer presents an abutment to a tab piece 24a on the timer disc 24. While the unit is inactive a similar tab piece 22b on unit speed disc 22 engages against cab 24a. Subsequently tab 22b is temporarily held by its own retainer, as will be later described.

An equivalent set of retainers 39 cooperate with the holding tabs of the second fold units. In this case, the tabs engage behind the retainer toe. The second-fold retainer 39 is the one primarily actuated, and it simultaneously operates the corresponding first-fold retainer, retainer arm 39a being in engagement with a rearwardly-extending arm 36a of retainer 36. Thus, there are twelve first-fold retainers laterally aligned, namely six timing units with a first fold retainer and a second fold retainer for each unit. There are also twelve corresponding second-fold retainers with the respective unit-speed disc tabs 22b and the timer disc tabs 24a. Any given unit operates in two steps. In the first step the timer disc 24 is released by its retainer when the leading edge of an article trips the measuring device in the folder, and in the second step the unit speed disc 22 is released by its retainer and travels at unit speed when the trailing edge of the article leaves the measuring device.

To effect such release, and at the same time to provide a means of operating the six units A–F sequentially, a cam device is utilized. This consists of a tubular member 40 (FIGS. 5 and 6) carrying sets of appropriately located cam elements 41 which may be in the form of round head rivets secured along and around the tube, although there are other possible configurations of the cams and the contacting part of the retainer arm. The cam carrier 40 has end shafts journalled in the frame. The front shaft 40a extends through the frame and carries a ratchet wheel 42 (FIGS. 3, 4 and 6) secured with key 43.

Pawls 44 and 45 (FIGS. 1, 3 and 4) are carried by pivot pins 44a, 45a on the back of a carrier plate 46. This is slidably supported in a bracket 47, being retained by a pair of plates 47a, 47b. Each pawl is urged toward the ratchet wheel by a spring wire 48 looped around the pivot pin and having one leg fastened in the pawl and the other one bearing against a pin 49. This double-acting non-reversible pawl arrangement produces a 30° counterclockwise movement of the ratchet wheel with each of the upstroke and the downstroke of the pawl carrier. The operating means is a small air cylinder motor 50 (FIGS. 1 and 2) mounted on the frame, and having its piston rod 50a connected to the pawl plate by clevis 51. The indexing action is rapid, and a limit means is provided to avoid over-running. This consists of abutment screws 52, 53 carried by lugs 54, 55 on the back face of the pawl carrier plate, and alternately engageable with the ratchet wheel at the end of the respective stroke.

Low-pressure air is kept constantly on the upper side of piston 50b (FIG. 1) coming by way of pipe 56 from pressure-reducing valve 57. This has the same effect as a spring, normally biasing the piston to bottom position. Then, when high-pressure air is admitted below the piston, the pressure differential moves the piston up. The high-pressure air comes by way of pipe 58, solenoid valve 59 and pipe 60. Valve 59 is normally closed, and opens when its solenoid coil 59a is energized, responsive to closing of measuring switch 61 in the folding machine. The circuit is from $L_1$, lines 62, 63, switch 61, line 64, coil 59a, and line 65 to $L_2$.

The control and actuating parts of the timer are shown in the idle or inactive condition. It can be seen in FIGURE 6 that the second retainer members from the back are at the moment in down, release, position, the arm 39a of that pair being engaged by one of the cam buttons. These are the retainers for unit-speed elements 22 of unit F–1, F–2. The tab 22b on the disc 22 is held against rotation by abutment with the tab 24a of the timer disc 24 which in turn is held stationary by arm 36 in the "up" position. Incident to the next operation of the camshaft, retainers 36 and 39 for the unit speed elements of unit F–1, F–2 will return to the "up" position. This next camshaft operation actuates the first unit, A–1, A–2, the cam buttons being arranged to operate the units in sequence from front to back, i.e., A through F, then back to A, etc.

Returning to the enlarged sectional view of units C–1, D–1, FIGURE 7, assume that unit C has completed a measuring operation. Referring to FIGURE 1, an article comes into the folder and operates switch 61. This causes an upstroke of the ratchet device, as before noted, permitting movement of cam carrier 40 an increment of 30°, whereby a cam button operates the retainer members out of obstructing relation with tab 24a of D–1 and D–2. Confining the description now to the first unit D–1 (since the second-fold unit acts in the same way)—timer disc 24 immediately begins to rotate at the proportional (half) speed. The drive is by the frictional engagement with friction face 23b of friction clutch 23, the latter being in normal constant rotation through the clutch 26, as before explained. Tab 22b on unit-speed disc 22 has been abutting tab 24a, and now is stopped by its own retainer member.

Timer disc 24 continues to rotate at half speed with shaft 10 while the folder switch 61 is held depressed by the passing article. When the trailing edge of the article releases the switch, the circuit to the solenoid of valve 59 is deenergized, the valve closes, and the low pressure air in the top end of cylinder 50 operates the ratchet pawl carrier plate downwardly. This rotates the cam tube 30°. The cam button which has been holding the retainer for timer disc 24 in released position is thereby moved, allowing the retainer to move back into normal position, where it will eventually stop disc 24 back at zero position. At the same time, a cam button operates the retainer for unit-speed disc 22 to release position.

Unit-speed gear 20, in frictional contact with disc 22, now tends to drive the released disc at unit speed. The other face of disc 22 is in frictional contact with friction clutch 23 which is turning at half speed. This half-speed drive, however, is by way of the free-wheeling clutch 26. The unit-speed drive therefore takes over, and the teeth 23c over-run the pawl 32. It will be noticed that the ball thrust bearing 25 permits unhampered rotation of the timer disc by the friction drive. The timer disc immediately goes from half speed to full, or unit, speed, the mid-point of the article having now been measured by the circumferential extent of travel of disc 24.

A trip pin 24b on timer disc 24 has traveled from starting, or zero, position, and continues around now and operates a finger 66 (FIGS. 1, 6 and 7). A similar finger cooperates with each timing unit, and all of the fingers are secured to a common rock bar 67. This is pivotally supported by a bracket 68 at the front and bracket 69 at the rear. These are joined by a brace member 70, and each bracket is supported on the respective end frame, having a depending portion fitting against the inside face of the end frame and a flange resting upon the top of the frame, where it is secured by a screw 71. Mounted on the rear bracket is a switch 72 in a switch housing 73. An operating finger 74 secured to rock bar 67 actuates the switch finger 72a in response to any one of the timing units. The arrangement on the second-fold side is similar excepting that the bracket flanges are arcuate, to conform with the frame, the corners of which are rounded concentric with the axis of the second-fold timer units. This permits adjustment of the position of second-fold switch 75.

Actuation of switch 72 closes a circuit to the first-fold operating means, here indicated simply as a solenoid 76. The article has traveled along the conveyor system and its middle is at the folding point, where it is now tucked by blade 77 into the bite of rolls 78, 79. It is carried then in its once-folded condition to the second-fold station, and when its middle arrives at the folding point, the second-fold unit D-2 on shaft 11 operates switch 75, energizing solenoid 80, whereby blade 81 tucks the article between rolls 82, 83. The first-fold circuit is from $L_1$, line 62, switch 72, line 84, solenoid 76 and line 85 to $L_2$. For the second fold, it is from $L_1$, lines 62, 86, switch 75, line 87, solenoid 80, and lines 88 and 85 to $L_2$. I have shown the folding means as a blade 77 or 81. Other folding means can of course be similarly controlled, and air jets have been used in one embodiment.

The timer disc 24 on shaft 10 continues to rotate at unit speed until its stop tab 24a engages the retainer at zero position. The unit-speed disc will still be some distance behind. The stopped disc 24 presents resistance to rotation of friction clutch 23, and, consequently, of unit-speed disc 22. The return of this disc to zero position is assured, however, since the half-speed drive clutch 26 will again pick up the clutch 23. The unit-speed tab 22b will come to rest against tab 24a. The retainer for 22b will remain in release position until the cam carrier moves at the next timing operation, as mentioned in regard to unit F.

Now that I have explained in full detail a folding operation controlled by a timer unit, a brief resume may further simplify the procedure, eliminating mechanical and electrical detail.

The first fold timer disc 24 of the next timing unit in sequence is held motionless by its retainer 36, and the corresponding timer disc for the second fold is held by its retainer 39. Particular attention will now be directed to the first fold operation, since it is duplicated, but slightly later in point of time, by the second fold operation.

The leading edge of an article closes switch 61, energizing solenoid 59a, and opening air valve 59. Air cylinder 50 moves indexing plate 46 upwardly, rotating cam cylinder 40 through 30°. A rivet cam 41 rocks retainer 36 (and second fold retainer 39) to release timer disc 24 which begins rotation at one-half unit speed with shaft 10 operating through overrunning clutch 26 and friction clutch 23.

When the trailing edge of the article leaves switch 61 the length of the article is "measured" by the circumferential amount of rotation of timer disc 24. Opening of switch 61 deenergizes solenoid 59a, permitting valve 59 to close so that the low pressure air in the head of cylinder 50 moves, indexing plate 46 downwardly, rotating cam cylinder 40 through another 30°. The next rivet cam releases the retainer for unit speed disc 22 which now rotates at unit speed by reason of its frictional engagement with unit speed gear 20.

Unit speed disc 22 frictionally picks up friction clutch 23 (which has been rotating at one-half unit speed with shaft 10) and clutch 23 now rotates at unit speed, carrying with it the timer disc 24 at unit speed. The friction clutch 23 is now overrunning the overrunning clutch 26.

At the moment when the mid-point of the article arrives at the folding blade a trip member 24b on timer disc 24 operates a switch 72 to energize a solenoid 76 to swing blade 77 for the first fold.

Similarly, a trip member on the timer disc for the second fold closes a switch 75 to energize solenoid 80 and swing folding blade 81 to effect the second fold when the once-folded article arrives at the second-fold zone.

The timer discs for the first and second fold finish their rotation when their retainer tabs arrive at starting, idle position where they are intercepted by their respective retainers 36 and 39, now released by their respective cams, and returned by springs 37 to retaining position.

Referring to FIGURES 5 and 6, 89 are frame spacer and bracing members, and 90 are mounting feet. A spring strip 91, supported by screws 92, 93 as shown, has a friction pad 91a bearing resiliently against the underside of cam-carrier tube 40 to help make the operation thereof smooth, avoid rattling and backlash in the ratchet, etc.

Spacers 94 and set collars 95 (FIGURE 6) position the retainer members in correct alignment with their corresponding discs in the timing units.

In the present timer unit there is no disconnectable clutch as used in certain prior art timing units. Both the unit-speed drive and the proportional-speed drive are through frictional means, continuously engaged but selectively detainable or releasable for rotation, acting in conjunction with an over-running arrangement.

What is claimed is:

1. In apparatus of the type described wherein operating means is disposed to perform an operation proportional to article length on each of a series of articles moving on a conveyor along a path past an operation zone, article-sensitive means located adjacent said path, controlling means for said operating means and responsive to actuation of said article-sensitive means comprising a plurality of article-measuring units, each adapted upon actuation to control a timed operational cycle for a respective article, each unit including a full speed driving member and a fractional speed driving member, a rotatable timer member, a first frictional torque transmitting means responsive to said fractional speed driving member and continuously effective on said timer member, a second frictional torque-transmitting means responsive to said full speed driving member and continuously effective on said timer member, a first retainer adapted, when engaged, to render said first torque-transmitting means ineffective, a second retainer adapted, when engaged, to render said second torque transmitting means ineffective, said article sensitive means being responsive to passage of the leading edge of an article thereby and effective to disengage said first retainer upon said passage, said article sensitive means being responsive to passage of the trailing edge of an article thereby and effective to disengage said second retainer, and means carried by said timer member and operatively effective on said operating means to produce an operation on the article as aforesaid when the article arrives at said operating zone.

2. Apparatus as defined in claim 1 wherein an element common to each said torque transmitting means consists of a friction clutch.

3. Apparatus as defined in claim 1 including, in combination therewith, indexing means operatively responsive to said article sensing means, for causing respectively successive members of said plurality of article measuring units to assume control of successively moving articles.

4. Apparatus as defined in claim 1 wherein said first and second torque transmitting means are in continuous operative frictional contact with said timer, and are rotatable but are axially unshiftable.

5. In apparatus of the type described wherein operating means is disposed to perform an operation proportional to article length on each of a series of articles moving on a conveyor along a path past an operation zone, article-sensitive means located adjacent said path, controlling means for said operating means and responsive to actuation of said article-sensitive means comprising a plurality of article-measuring units, each adapted upon actuation to control timed operational cycle for a respective article, each unit including a first shaft continuously rotating at full speed, a second shaft continuously rotating at a fractional speed, an overrunning clutch continuously rotatable with said second shaft, a timer disc freely rotatable on said second shaft in operative friction-drive engagement with said overrunning clutch, a rotatable driving member freely mounted on said second shaft but in operative driving engagement with said full speed shaft whereby said driving member continuously rotates at full speed, friction drive means interposed between said member and said timing disc and adapted to apply a full speed driving torque to said timer disc, a first retainer engageable with said timer disc and adapted, when engaged, to prevent rotation thereof, a second retainer engageable with said driving member and adapted, when engaged, to prevent applicaiton of said driving torque, said article-sensitive means being responsive to passage of the leading edge of an article therepast and effective to disengage said first retainer upon said passage whereby to render said timer disc responsive to said overrunning clutch, said article sensitive means being also responsive to passage of the trailing edge of the article therepast and effective to disengage said second retainer whereby to render said timer disc responsive to said full speed driving member, and means carried by said timer member and operatively effective on said operating means to produce an operation on the article as aforesaid when the article arrives at said operating zone.

6. Apparatus as defined in claim 5 wherein the friction drive engagement between said timer disc and said overrunning clutch includes a friction clutch normally adapted to rotate with said overrunning clutch, but disposed to overrun said overrunning clutch when said timer disc is rotating at full speed.

7. Apparatus as defined in claim 5 including, in combination therewith, indexing means operatively responsive to said article sensing means for causing respectively successive members of said plurality of article-measuring units to assume control of successive moving articles whereby each article is timed by an individual unit.

8. Apparatus as defined in claim 7 wherein said indexing means includes a rotatable cam-carrying drum having cams fixed on the external periphery thereof, each cam adapted to be brought to operative registry with a respective retainer and sequentially arranged along said drum whereby, upon successive increments of rotation, to disengage respectively successive retainers in respectively successive units.

9. Apparatus as defined in claim 8 wherein there is provided means operatively responsive to said article sensitive means and engageable with said indexing means whereby, when the leading edge of an article passes said article-sensitive means said drum is moved through an increment of rotation to disengage the first retainer, and when the trailing edge of an article passes said article-sensitive means said drum is moved through a further increment of rotation to disengage the second retainer.

10. In apparatus of the type described wherein operating means is disposed to perform an operation proportional to article length on each of a series of articles moving on a conveyor along a path past an operation zone, article-sensitive means located adjacent said path, controlling means for said operating means and responsive to actuation of said article-sensitive means comprising a plurality of article-measuring units, each adapted upon actuation to control a timed operational cycle for a respective article, each unit including a full speed driving member and a fractional speed driving member, a rotatable timer member, a first frictional torque transmitting means responsive to said fractional speed driving member and continuously effective on said timer member, a second frictional torque-transmitting means responsive to said full speed driving member and continuously effective on said timer member, a first retainer adapted, when engaged, to render said first torque-transmitting means ineffective, a second retainer adapted, when engaged, to render said second torque transmitting means ineffective, said article sensitive means being responsive to passage of the leading edge of an article thereby and effective to disengage said first retainer upon said passage, said article sensitive means being responsive to passage of the trailing edge of an article thereby and effective to disengage said second retainer, and means carried by said timer member and operatively effective on said operating means to produce an operation on the article as aforesaid when the article arrives at said operating zone, said first torque transmitting means including a continuously rotating overrunning clutch frictionally operatively effective on said timer member but disposed to become ineffective when said second frictional torque transmitting means is released by disengagement of said second retainer whereupon said timer, operating at full speed, overruns said clutch.

11. In apparatus of the type described wherein operating means is disposed to perform an operation proportional to article length on each of a series of articles moving on a conveyor along a path past an operation zone, article-sensitive means located adjacent said path, controlling means for said operating means and responsive to actuation of said article-sensitive means comprising a plurality of article-measuring units, each adapted upon actuation to control a timed operational cycle for a respective article, each unit including a full speed driving member and a fractional speed driving member, a rotatable timer member, a first frictional torque transmitting means responsive to said fractional speed driving member and continuously effective on said timer member, a second frictional torque-transmitting means responsive to said full speed driving member and continuously effective on said timer member, a first retainer adapted, when engaged, to render said first torque-transmitting means ineffective, a second retainer adapted, when engaged, to render said second torque transmitting means ineffective, said article sensitive means being responsive to passage of the leading edge of an article thereby and effective to disengage said first retainer upon said passage, said article sensitive means being responsive to passage of the trailing edge of an article thereby and effective to disengage said second retainer, and means carried by said timer member and operatively effective on said operating means to produce an operation on the article as aforesaid when the article arrives at said operating zone, a second operating means, a second full speed driving member, a second fractional speed driving member, a second rotatable timing member, a third frictional torque-transmitting means responsive to said second fractional speed driving member and continuously effective on said second timing member, a fourth frictional torque-transmitting means responsive to said second full speed driving member and continuously effective on said second timer member, a third retainer adapted, when engaged, to render said third torque-transmitting means ineffective, a fourth retainer adapted, when engaged, to render said fourth torque-transmitting means ineffective, said article sensitive means being likewise responsive to passage of the leading edge of an article thereby and effective to disengage said third retainer upon said passage, said article sensitive means being likewise responsive to passage of the trailing edge of an article thereby and effective to disengage said fourth retainer, and means carried by said second timer member and operatively effective on said second operating means to produce a second operation on the article when it arrives at a second operating zone.

References Cited in the file of this patent

UNITED STATES PATENTS

| | | |
|---|---|---|
| 1,960,940 | Kahn | May 29, 1934 |
| 2,261,226 | Clegg | Nov. 4, 1941 |
| 2,524,415 | Abell et al. | Oct. 3, 1950 |